United States Patent
Seletskiy et al.

(10) Patent No.: US 12,432,251 B2
(45) Date of Patent: Sep. 30, 2025

(54) SYSTEMS AND METHODS FOR DETECTING AND RESOLVING USER ACCOUNT COMPROMISE USING A PASSWORD RESET

(71) Applicant: Cloud Linux Software Inc., Estero, FL (US)

(72) Inventors: Igor Seletskiy, Palo Alto, CA (US); Serhii Polishchuk, Odessa (UA); Marat Sataiev, Zaporizhzhia (UA)

(73) Assignee: Cloud Linux Software Inc., Estero, FL (US)

( * ) Notice: Subject to any disclaimer, the term of this patent is extended or adjusted under 35 U.S.C. 154(b) by 260 days.

(21) Appl. No.: 18/315,574

(22) Filed: May 11, 2023

(65) Prior Publication Data
US 2024/0380780 A1 Nov. 14, 2024

(51) Int. Cl.
H04L 9/40 (2022.01)

(52) U.S. Cl.
CPC ...... H04L 63/1441 (2013.01); H04L 63/0236 (2013.01); H04L 63/029 (2013.01); H04L 63/1416 (2013.01); H04L 63/1425 (2013.01)

(58) Field of Classification Search
CPC ............. H04L 63/1441; H04L 63/0236; H04L 63/1416; H04L 63/1425
See application file for complete search history.

(56) References Cited

U.S. PATENT DOCUMENTS

| | | | |
|---|---|---|---|
| 7,032,168 B1* | 4/2006 | Gerace | G06Q 30/0277 707/E17.116 |
| 7,134,141 B2* | 11/2006 | Crosbie | H04L 63/1416 709/224 |
| 8,613,064 B1* | 12/2013 | Roy | G06F 21/316 726/7 |
| 9,148,424 B1* | 9/2015 | Yang | H04L 63/083 |
| 9,379,896 B1* | 6/2016 | Altman | G06F 21/31 |
| 9,781,152 B1* | 10/2017 | Mistratov | G06F 21/577 |
| 9,961,066 B1* | 5/2018 | Kitchen | H04L 63/0807 |
| 2006/0041756 A1* | 2/2006 | Ashok | G06F 21/31 726/26 |
| 2007/0226304 A1* | 9/2007 | Virk | G06Q 10/107 709/206 |

(Continued)

Primary Examiner — Hieu T Hoang
(74) Attorney, Agent, or Firm — ArentFox Schiff LLP; Michael Fainberg (57) ABSTRACT

Disclosed herein are systems and method for detecting and resolving account compromise, the method comprising: configuring a web application firewall (WAF) to monitor events in a web application following a successful login into a user account of the web application; collecting, by the WAF, event data of a user session on the web application; determining whether the collected event data comprises malicious activity by comparing the collected event data to historic event data indicative of the malicious activity; in response to determining, by the WAF, that the collected event data corresponds to the historic event data: storing an indication that the user account is compromised in a database; generating an alert indicating that the user account is compromised, wherein the alert comprises a prompt to reset a password of the user account; and blocking, by the WAF, further access to the user account in the user session.

19 Claims, 9 Drawing Sheets

(56) References Cited

U.S. PATENT DOCUMENTS

| | | | |
|---|---|---|---|
| 2009/0199294 A1* | 8/2009 | Schneider | G06F 21/316 726/18 |
| 2010/0198670 A1* | 8/2010 | Kano | G06Q 30/0214 705/14.45 |
| 2013/0254857 A1* | 9/2013 | Bajenov | H04L 63/083 726/7 |
| 2014/0075209 A1* | 3/2014 | Cha | H04N 21/4325 713/193 |
| 2014/0143295 A1* | 5/2014 | Girsch | H04L 63/08 709/202 |
| 2015/0350193 A1* | 12/2015 | Honda | H04L 63/1416 726/8 |
| 2016/0127343 A1* | 5/2016 | Schiller | H04L 63/0807 726/9 |
| 2016/0197914 A1* | 7/2016 | Oberheide | H04L 63/0853 713/183 |
| 2017/0017810 A1* | 1/2017 | Bolotin | H04W 12/068 |
| 2017/0063884 A1* | 3/2017 | Seigel | H04L 63/1416 |
| 2017/0214712 A1* | 7/2017 | Maxwell | H04L 63/1441 |
| 2017/0352078 A1* | 12/2017 | Rosenfeld | G06Q 30/0607 |
| 2018/0027006 A1* | 1/2018 | Zimmermann | H04L 63/0227 726/11 |
| 2018/0167412 A1* | 6/2018 | Barrett | H04L 63/1491 |
| 2018/0198790 A1* | 7/2018 | Weis | G06F 21/31 |
| 2018/0275934 A1* | 9/2018 | Takenaka | G06F 3/1205 |
| 2018/0324161 A1* | 11/2018 | Kona | H04L 63/10 |
| 2020/0213334 A1* | 7/2020 | Kutner | H04L 63/1416 |
| 2022/0124084 A1* | 4/2022 | Maylor | H04L 63/205 |
| 2022/0272116 A1* | 8/2022 | Li | G16Y 10/75 |
| 2023/0141952 A1* | 5/2023 | West | G06F 1/163 707/785 |
| 2024/0314138 A1* | 9/2024 | Tiwari | H04W 12/63 |

\* cited by examiner

SYSTEMS AND METHODS FOR DETECTING AND RESOLVING USER ACCOUNT COMPROMISE USING A PASSWORD RESET

FIELD OF TECHNOLOGY

The present disclosure relates to the field of data security, and, more specifically, to systems and methods for detecting and resolving user account compromise using a password reset.

BACKGROUND

In the realm of cybersecurity, one of the first points of defense against a security breach is a user password. Unfortunately, a password may get lost due to carelessness, deceit (e.g., phishing, password reset mailing, etc.), use of a known weak password, and/or brute force. When attackers gain access to accounts, they can conduct malicious activity on behalf of the user, such as install malware, arrange mailing lists, store malware on a site due to which the site loses its reputation, etc.

According to forensic logs, it is observed that before the appearance of malicious activity, there is often a successful login into a system. This suggests that the attackers do not use the vulnerabilities of the site, server, database, etc., but use login credentials to act as the authorized user of the compromised account. Accordingly, there exists a need for a way to enable user access to an account while preventing account compromise.

SUMMARY

In one exemplary aspect, the techniques described herein relate to a method for detecting and resolving account compromise, the method including: configuring a web application firewall (WAF) to monitor events in a web application following a successful login into a user account of the web application; collecting, by the WAF, event data of a user session on the web application; determining whether the collected event data includes malicious activity by comparing the collected event data to historic event data indicative of the malicious activity; in response to determining, by the WAF, that the collected event data corresponds to the historic event data: storing an indication that the user account is compromised in a database; generating, on a device of an authorized user of the user account, an alert indicating that the user account is compromised, wherein the alert includes a prompt to reset a password of the user account; and blocking, by the WAF, further access to the user account in the user session.

In some aspects, the techniques described herein relate to a method, wherein generating the alert is further in response to detecting a subsequent login attempt and identifying the indication in the database.

In some aspects, the techniques described herein relate to a method, wherein the collected event data includes an IP address, and wherein determining that the collected event data corresponds to the historic event data includes determining that the IP address is of a malicious entity monitored in the historic event data.

In some aspects, the techniques described herein relate to a method, wherein the collected event data further includes a hostname of the web application and a username of the user account.

In some aspects, the techniques described herein relate to a method, further including: in response to determining that the collected event data corresponds to the historic event data, storing a record including the hostname and the username in a remote database (RDB) until the new password is received; and deleting the record in response to receiving the new password.

In some aspects, the techniques described herein relate to a method, further including: creating a list of hosts that require a password reset; configuring the WAF to collect the event data and transmit the alert for the list of hosts.

In some aspects, the techniques described herein relate to a method, wherein the indication is a string including a hostname of the web application and a username of the user account, further including: in response to detecting the successful login, generating and storing the string in a local access database (LDB); transmitting the string to a remote access database (RDB).

In some aspects, the techniques described herein relate to a method, further including: configuring the WAF to check if an input string, including a given hostname and a given username, of a subsequent successful login is present in the RDB.

In some aspects, the techniques described herein relate to a method, wherein storing the string in the LDB includes: creating a record for the string in the LDB; storing a hash value of a user password and a cookie value of an authorization cookie in the LDB; and writing, in the RDB, a zero to password and cookie fields in absence of the string.

In some aspects, the techniques described herein relate to a method, further including: configuring the WAF to: compare an input hash value of an input password with the hash value of the password in the LDB; and redirect the user to a password reset page in response to detecting, based on a comparison, that the input hash value matches the hash value in the LDB.

In some aspects, the techniques described herein relate to a method, further including: configuring the WAF to: compare an input cookie value with the cookie value of the authorization cookie in the LDB; and redirect a user to a password reset page in response to detecting, based on a comparison, that the input cookie value matches the cookie value in the LDB.

In some aspects, the techniques described herein relate to a method, further including updating the RDB and LDB with the new password in response to confirming that the new password does not match an old password.

In some aspects, the techniques described herein relate to a method, further including: configuring the WAF to monitor the web application for a successful password change; in response to receiving the new password, generating a string using cookies for a site name and address of the web application.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting and resolving account compromise, including: a memory; and a hardware processor communicatively coupled with the memory and configured to: configure a web application firewall (WAF) to monitor events in a web application following a successful login into a user account of the web application; collect, by the WAF, event data of a user session on the web application; determine whether the collected event data includes malicious activity by comparing the collected event data to historic event data indicative of the malicious activity; in response to determining, by the WAF, that the collected event data corresponds to the historic event data: store an indication that the user account is compromised in a database; generate, on a device of an authorized user of the user account, an alert indicating that the user account is compromised, wherein the alert includes a prompt to reset a password of the user account; and block, by the WAF, further access to the user account in the user session.

In some aspects, the techniques described herein relate to a non-transitory computer readable medium storing thereon computer executable instructions for detecting and resolving account compromise, including instructions for: configuring a web application firewall (WAF) to monitor events in a web application following a successful login into a user account of the web application; collecting, by the WAF, event data of a user session on the web application; determining whether the collected event data includes malicious activity by comparing the collected event data to historic event data indicative of the malicious activity; in response to determining, by the WAF, that the collected event data corresponds to the historic event data: storing an indication that the user account is compromised in a database; generating, on a device of an authorized user of the user account, an alert indicating that the user account is compromised, wherein the alert includes a prompt to reset a password of the user account; and blocking, by the WAF, further access to the user account in the user session.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting and resolving user account compromise using a password reset. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The follow terms are used in the present disclosure:
RDB—remote database
LDB—local database
WAF—web application firewall
Cookie—request headers cookie
Login—user name field.
Authentication—authorization process on the server The present disclosure describes analytics for determining a correlation between malicious activity and access logs of a compromised account. The analytics involve collecting information about compromised accounts on observed hosts and storing this data in a database. Using audits and tracing of process execution, any malicious activity can then be detected. Using the database and a WAF, the next attempt to log in to a compromised account may be blocked. In some aspects, the user may be redirected to a password reset page. Thus, the compromised password may be changed by the user, and as a result, an attacker will lose control over the compromised account. Preventing compromised user authorization will restrict access to user data by the attacker. This will keep personal data stored in an account dashboard such as e-mail, posts, settings, and other information designed by an application, safe from collection by an intruder. The systems and methods of the present disclosure prohibit automatic utilities and bots from malicious activity since they do not have the functionality to reset the password by design. This will require additional commitment, research and development of attacking systems from an attacker.

Figure 1:
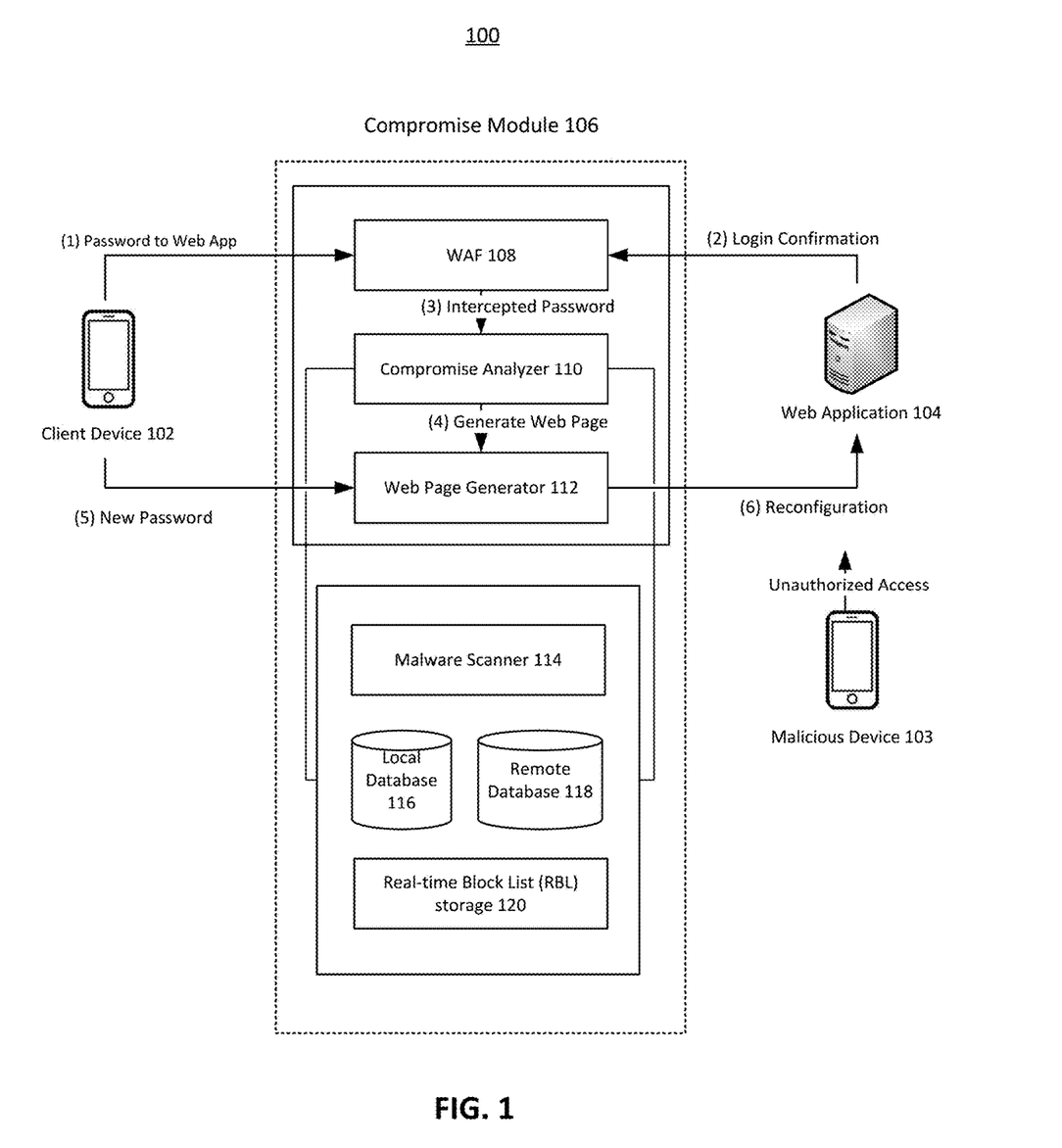
FIG. 1 is a block diagram illustrating a system for detecting and resolving user account compromise using a password reset.

FIG. 1 is a block diagram illustrating system 100 for detecting and resolving user account compromise using a password reset. System 100 features client device 102, web application 104, compromise module 106, and malicious device 103. Suppose that malicious device 103 has the login credentials of the user account associated with a user of client device 102. Malicious device 103 may use the information to log into web application 104. WAF 108 of compromise module 106 may intercept the communication between web application 104 and malicious device 103 and may provide the information to compromise analyzer 110. Compromise analyzer 110 is configured to correlate previous data of malicious activity with the activity intercepted by WAF 108. For example, compromise analyzer 110 may receive intercepted commands and input those commands into a machine learning algorithm configured to classify malicious activity. In another example, malicious device 103 may infect web application 104, and this infection may be detected by malware scanner of compromise module 106.

Based on determining that the malicious device 103 is in fact malicious, compromise analyzer 110 may block further access to the user account.

A web application firewall (WAF) 108 is a type of application firewall that applies specifically to web applications (e.g., web application 104). Typically, a WAF 108 monitors and filters HTTP traffic between a web application 104 and a client device 102. Unlike a regular firewall, which serves as a security gate between servers, a WAF 108 can filter the content of specific web applications. A web application 104 or web app 104 is a client-server computer program that a client runs in a web browser. A web app 104 is stored on a remote server and delivered over the Internet through a browser interface. The web browser is effectively a part of the application architecture. However, certain web applications may provide different types of access—one being the web application in the browser, and another being a web service providing an API to interact with applications or between applications. The WAF 108 described in the present disclosure may handle any type of access.

By inspecting HTTP traffic, a WAF 108 can prevent attacks such as SQL injections, cross-site scripting (XSS), file inclusion, and security misconfigurations, originating from a web application. A WAF 108 identifies these attacks using parsing, signature detection, and specially configured rule-sets (also known as policies).

The functionality of a WAF 108 can be implemented in software or hardware. For example, a WAF may be a virtual or physical appliance (e.g., a stand-alone device or network component) that prevents vulnerabilities in web applications from being exploited by outside threats.

Compromise module 106 (e.g., ModSecurity) may be a web server module that uses infection vector detection, which collects event data (e.g., metadata) of incidents exposing compromised accounts. Such event data may include a hostname and login credentials (e.g., username and password) to fill a real-time block list (RBL) 120. Compromise module 106 may store data including flags, strings, numbers, etc., in persistent storage of a server hard drive (e.g., local database 116). The data about the hostname, username and password hash may also be stored in the persistent storage.

In addition, when a login attempt is detected compromise module 106 may examine if there was a successful login. If the login is unsuccessful, then compromise module 106 may ignore the request. If the login is successful, compromise module 106 examines whether the previously stored collections already include data about the exact hostname and username. If the data is not present in the local storage (e.g., local database 116), compromise module 106 examines whether a combination of the hostname and username is present in the RBL 120. If there is no data, compromise module 106 marks the combination as verified and continues the transaction.

In some aspects, the local database 116 is stored on the file system of a server on the customer end along with the content management system (CMS) application. For example, local database 116 may be stored on client device 102 or a server connected to client device 102 in a local area network. This database, also known as the persistent storage, enables compromise module 106 to store information about a client's session between requests. In this particular system, it is used to store the hash of the password, session cookies, username (e.g., WordPress username), and the hostname of the web application 104.

The remote database 118 is an integral part of compromise module 106 internal architecture and is stored on company servers (e.g., Imunify360). Its purpose is to collect incident data for further analysis, enabling compromise module 106 to track successful login attempts, redirects, and password change actions.

The RBL storage 120 is another internal server in the compromise module 106 architecture. It is used as a list of records that can receive requests, examine the record, and send a response indicating whether the record exists or not. The response can be interpreted as either true or false. As soon as compromise module 106 detects that a device's behavior is malicious, compromise module 106 adds a record of the user and host to the RBL storage 120. Any further attempts to log in to the account are subsequently restricted and redirected to the password reset page. Additionally, compromise module 106 blocks the new session cookie (captured in local database 116).

If the data is present in RBL 120, compromise module 106 saves the values of the hostname, username, password hash value, and session cookies (to deny further access by cookie to local database 116 as a string structured as "<username_SHA1_hash>.<hostname>" and proceeds with a redirect using web page generator 112 to a password reset page.

If the "<username_SHA1_hash>.<hostname>" data is present in local database 116, compromise module 106 checks if the stored password hash matches the successful login password hash. If a match exists, compromise module 106 executes a redirect to a compromise alert page, which is shown in example 200 of FIG. 2. The compromise alert page may include an explanation that the user account has been compromised and may include a link to a password reset webpage that receives a new password.

The redirect logic can be explained as follows: after a successful login request to a web application 104, compromise module 106 runs a check through RBL 120 to determine if the string structured as "<username_SHA1_hash>.<hostname>" is listed in the collection. If listed, compromise module 106 redirects the user to a compromise alert webpage and/or a password reset webpage (in some aspects, both webpages are implemented in a single webpage that alerts the user of a compromised user account and receives a new password) and saves the cookies and hash value of the compromised password in persistent storage for a threshold period of time (e.g., 24 hours). Storing the hash value in local database 116 enables compromise module 106 to compare it during the next login attempt, allowing for the determination of whether the password has changed. If the threshold period of time is exceeded, there is no need to retain the hash value in storage. The next request compromise module 106 checks is if there is a password hash or cookies for a current session in persistent storage. If a record exists, compromise module 106 redirects the user to a password reset webpage.

In terms of cookies, after a successful login, an attacker's script can use session cookies for further malicious activity, such as installing a malicious plugin. It is necessary to block requests containing these cookies, as an automated bot can ignore the redirect to a password change page and attempt to perform additional malicious actions. By capturing these cookies in the persistent storage, compromise module 106 can examine them in subsequent requests and block the request if there is a match.

RBL zone filling logic can be explained as follows. When malware scanner 114 monitors malware spikes on a vector intersection for a web page login, it identifies an infection when a matching spike is detected and collects the hostname and username from the incidents. Malware scanner 114 then writes data to RBL 120 and tracks through incidents the redirect triggered cases. Furthermore, compromise module 106 removes records in case there was a password change action detected.

The following is an application processing interface (API) description of RBL 120:

Token, Header X-Auth: <token_key>
List Existing Records:
  curl https://api.imunify360.com/api/rbl/wp-compromised -H "X-Auth: Token"
Add Records:
  curl -X PUT https://api.imunify360.com/api/rbl/wp-compromised -H "X-Auth: Token" -H 'Content-type: application/json' -d '{"data": [{"record":"test"}, {"record": "admin.im360wp.com"}, {"record": "marat.im360wp.com"}]}'

The system is designed to protect numerous independent applications on separate servers (with a local database 116 on each) belonging to different customers. Therefore, it requires an isolated remote servers (RBL storage 120 and remote database 118) that does not rely on the availability or stability of a particular customer server. The types of these databases are also different and designed to perform optimally for their specific purposes. Local database 116 is a storage system developed alongside compromise module 106. RBL storage 120, on the other hand, is a DNS-based system, while remote database 118 is a ClickHouse column-oriented database management system (DBMS).

While the RDB and RBL servers can be the same physical server, it is a more sustainable practice to keep them separate to handle huge loads and to have a more secure and reliable architecture.

Figure 3:
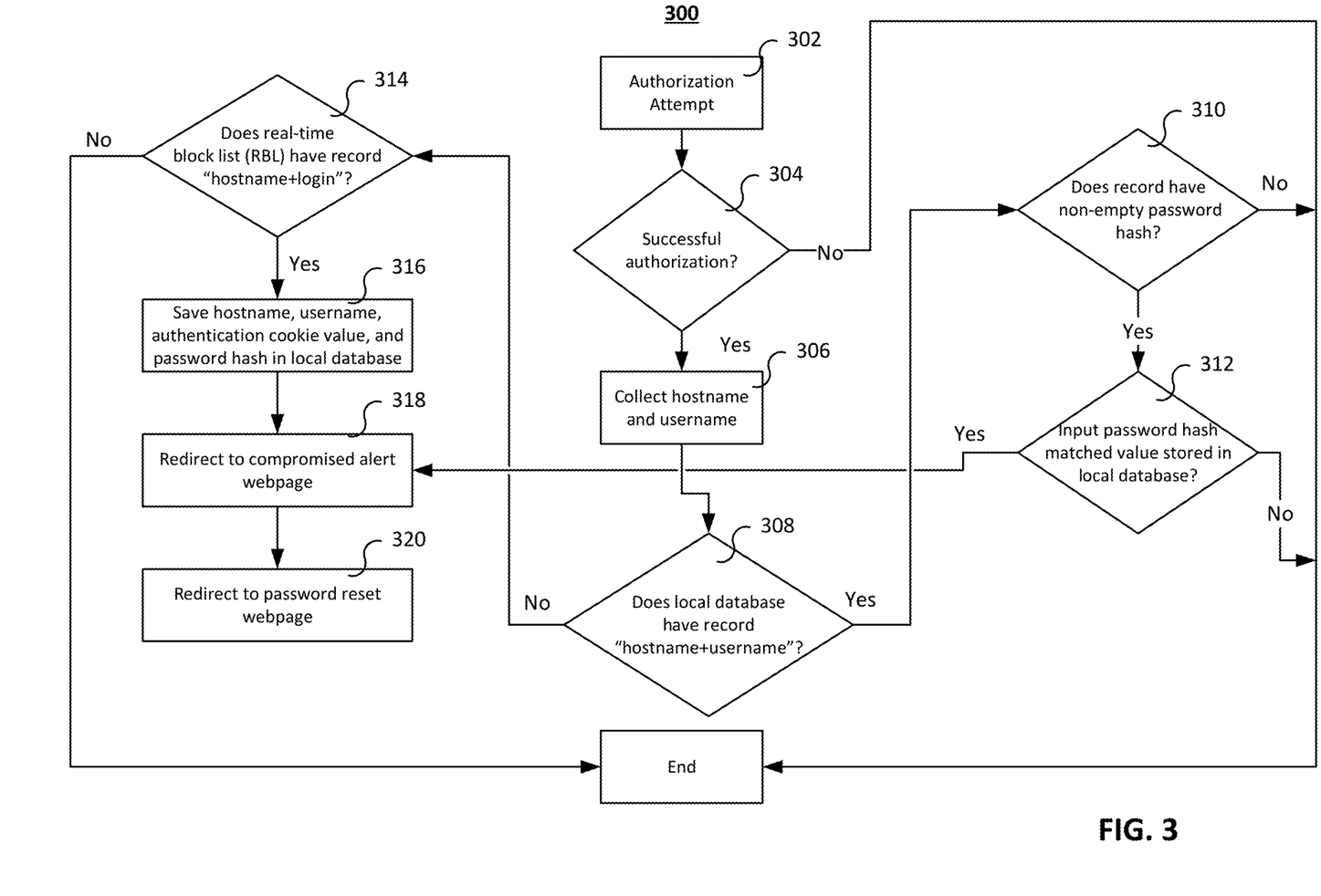
FIG. 3 illustrates a flow diagram of a method for forcing a password reset.

FIG. 3 illustrates a flow diagram of method 300 for forcing a password reset. Method 300 is an example of a user accessing a compromised user account of web application 104 and the technical approach to confirming the compromised state using local database 116 and real-time block list 120.

At 302, compromise module 106 observes authorization attempts. For example, WAF 108 intercepts login credential inputs in a login page of web application 104. At 304, compromise module 106 determines whether the authorization attempt was successful (i.e., whether the login credentials were accepted and web application 104 enables access to a user account). In response to an unsuccessful authorization attempt, method 300 ends. However, in response to a successful authorization attempt, method 300 proceeds to 306, where compromise module 106 collects a hostname of web application 104 (e.g., www.mycatblog.com) and a username (e.g., ABC123) in the login credentials.

At 308, compromise module 106 determines whether local database 116 includes a record that includes a string that concatenates the hostname and the username. For example, compromise module 106 may determine whether "ABC123.www.mycatblog.com" is in a record of local database 116. If a record exists, method 300 advances to 310, where compromise module 106 determines whether the record includes a non-empty password hash. If a non-empty password hash is not included in the record, method 300 ends. Otherwise, at 312, compromise module 106 determines whether a hash of the input password of the login credentials matches the non-empty password hash. If the match does not exist, method 300 ends. This suggests that the password may have been changed by the authorized user.

If at 308, compromise module 106 determines that local database 116 does not have the record including the string, method 300 proceeds to 314, where compromise module 106 determines whether the string is in real-time block list 120. If the string is not in the real-time block list 120 either, compromise module 106 concludes that the account is not compromised and method 300 ends. However, if the string is present in the real-time block list 120, this means that the user account was compromised and at 316, the hostname, username, authentication cookie value, and hash value of the input password is stored by compromise module 106 in local database 116.

Figure 2:
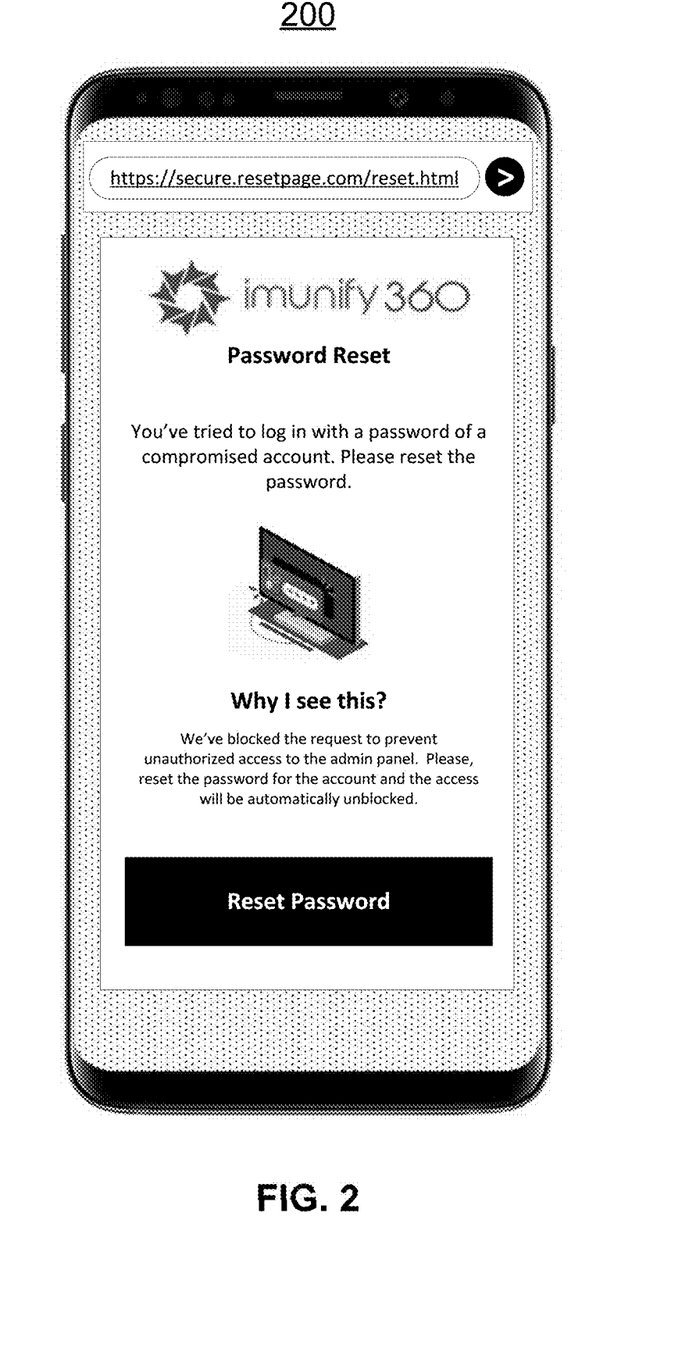
FIG. 2 is a diagram illustrating a compromise alert webpage.

From 316 and 312 (specifically in response to determining a match in the input password hash value and hash value stored in local database 116), method 300 proceeds to 318, where compromise module 106 redirects the user to a compromised alert webpage (as shown in FIG. 2). The user may then select a password reset link and be redirected to a password reset page where a new password may be entered at 320.

Figure 4:
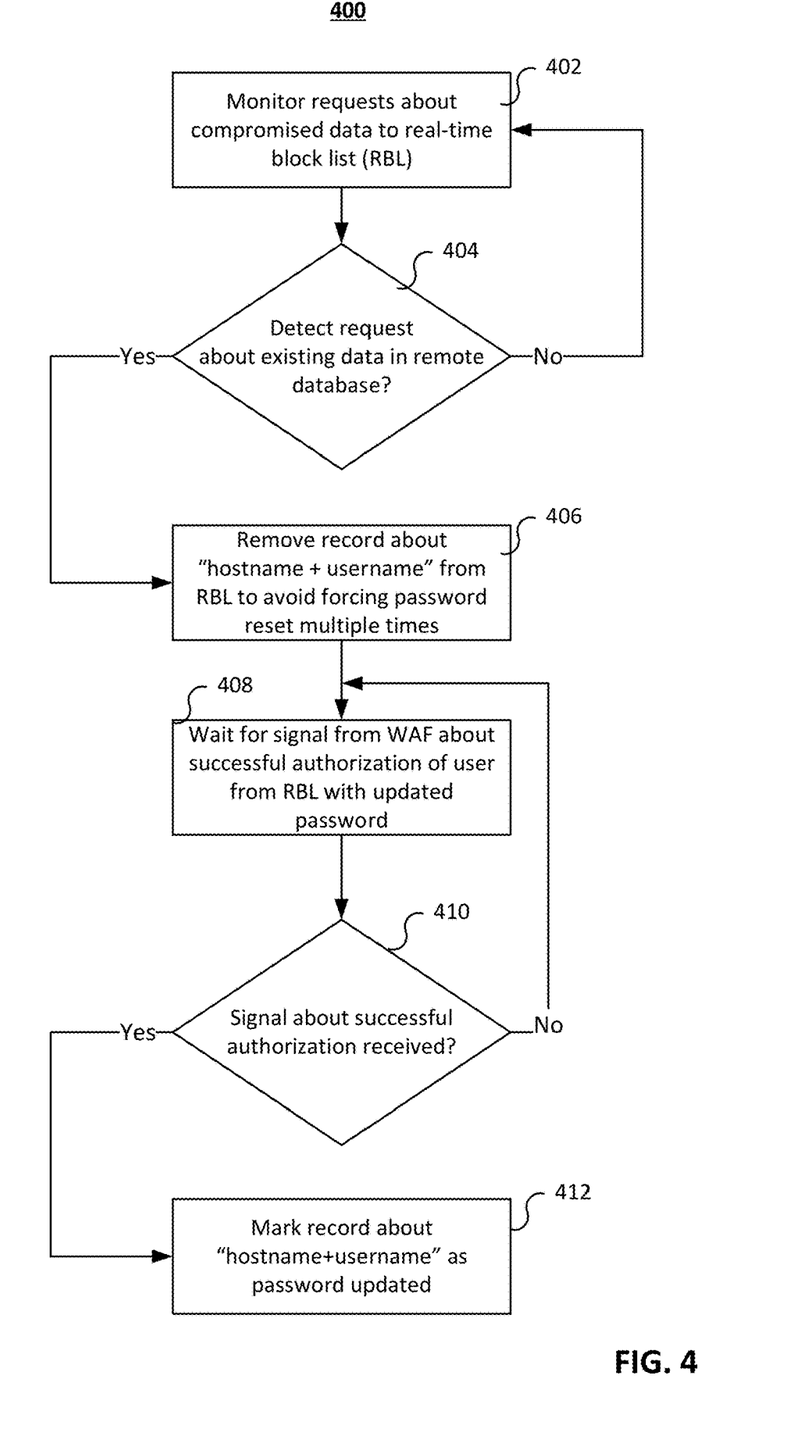
FIG. 4 illustrates a flow diagram of a method for forcing a password reset using a remote database.

FIG. 4 illustrates a flow diagram of method 400 for forcing a password reset using a remote database. At 402, compromise module 106 monitors the data in requests to real-time block list 120. At 404, compromise module 106 determines whether a request to real-time block list 120 includes a string in a record from remote database 118. If no string is detected, method 400 returns to 402 where further monitoring occurs. However, if the string is detected, method 400 proceeds to 406, where compromise module 106 removes the record from real-time block list 120. This helps avoid forcing password resets multiple times. Thus, the blocking typically provided by real-time block list 120 is performed on the side of WAF 108.

At 408, compromise module 106 then waits for a signal from WAF 108 that indicates successful authorization of the user with an updated password. At 410, compromise module 106 determines whether the signal has been received. In response to receiving the signal, compromise module 106 marks a record in remote database 118 with the corresponding string (i.e., "<username_SHA1_hash>.<hostname>") with the updated password. More specifically, the incidents are sent to remote database 118 and are utilized in a subsequent query to delete a record from the RBL storage 120.

Figure 5:
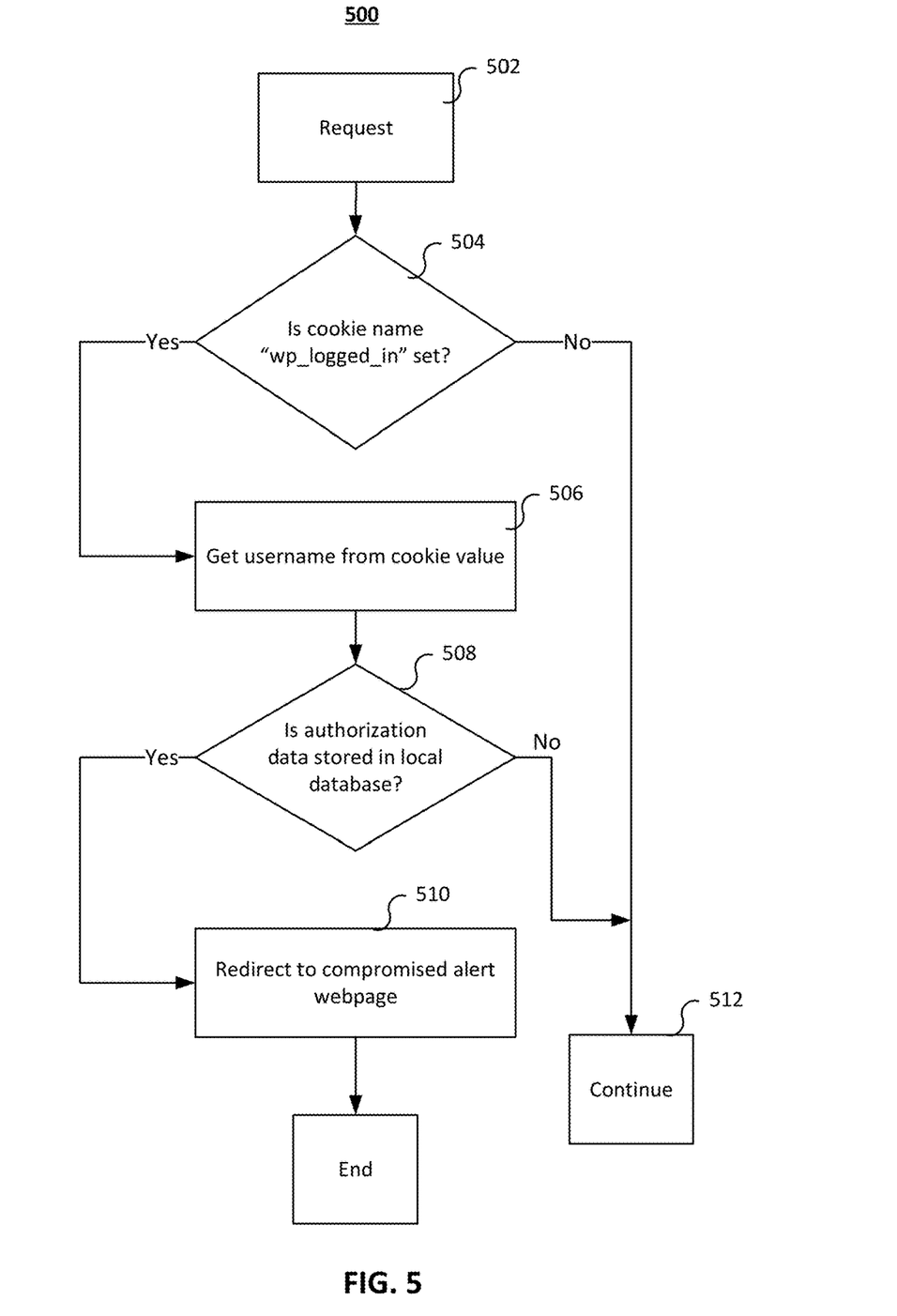
FIG. 5 illustrates a flow diagram of a method for preventing unauthorized activity on a compromised user account.

FIG. 5 illustrates a flow diagram of method 500 for preventing malicious activity on a compromised user account. It should be noted that FIG. 5 shows the case of a WordPress CMS, and operations on authentication cookies may vary for any application (web application). At 502, compromise module 106 detects a request for performing activity (e.g., data access) on web application 104. It should be noted that in this example, the request is from a malicious entity (e.g., an unauthorized user that compromised a user account). At 504, compromise module 106 checks for authorization cookies (e.g., whether cookie name "wp_logged_in" is set in an exemplary WordPress content management system). If the authorization cookies are not detected, method 500 proceeds to 512, where the request is granted. However, if the authorization cookies are detected by compromise module 106, at 506, compromise module 106 retrieves a username from the authorization cookies. If compromise module 106 detected that cookies were obtained subsequent to logging in to the compromised account, compromise module 106 will retain them in local database 116 and prohibit any further actions utilizing these cookies by redirecting the attacker to a reset page. At 508, compromise module 106 determines whether the username is present in local database 116. In response to determining that the username is in the local database, method 500 proceeds to 510, where compromise module 106 redirects the user to a compromised alert webpage. This prevents the unauthorized user from performing any other actions on the user account. If the user name is not present in the local database, however, the request from 502 is granted in 512.

Figure 6:
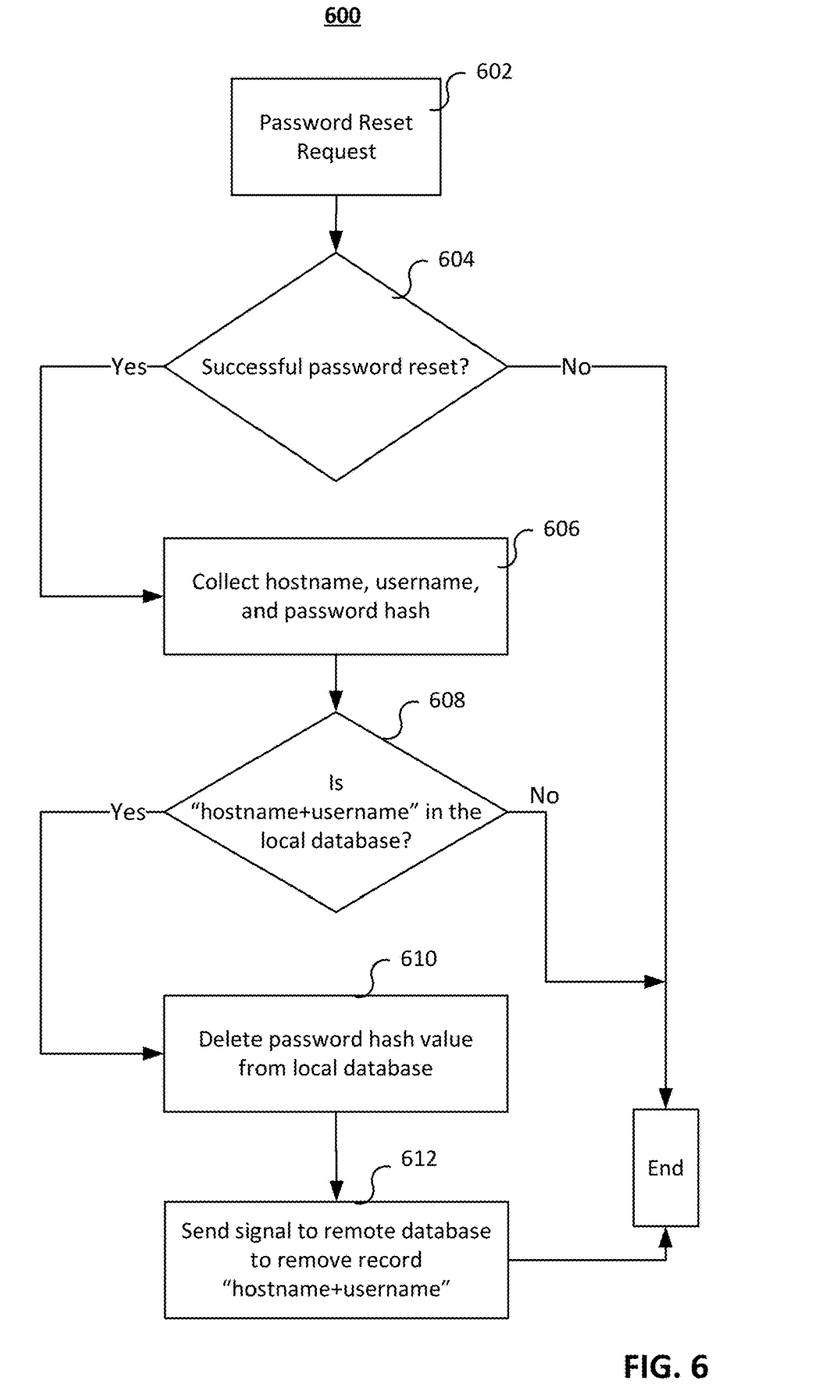
FIG. 6 illustrates a flow diagram of a method for monitoring a password reset.

FIG. 6 illustrates a flow diagram of method 600 for monitoring a password reset. At 602, compromise module 106 transmits, via the password reset webpage, an incoming password reset request. At 604, compromise module 106 checks if the password reset attempt was successful by confirming with web application 104 that the old password no longer works. In response to determining that password reset was successful, method 600 proceeds to 606, where compromise module 106 collects the hostname, username, and hash value of the new password. At 608, compromise module 106 determines whether the string concatenating the hostname and username is in local database 116. In response to determining that the string is not, method 600 ends. However, if the string is in local database 116, at 610, compromise module 106 deletes the password hash value (of the old password) from local database 116. At 612, compromise module 106 transmits a signal to remote database 118 to remove any records associated with the string.

The easiest way to force a password reset is to change the stored password hash value in an application database. Due to the fact that the user does not know that his data may have been leaked to intruders, an email notification that the account has been compromised and an account password needs to be changed do not have the desired effect.

Figure 7:
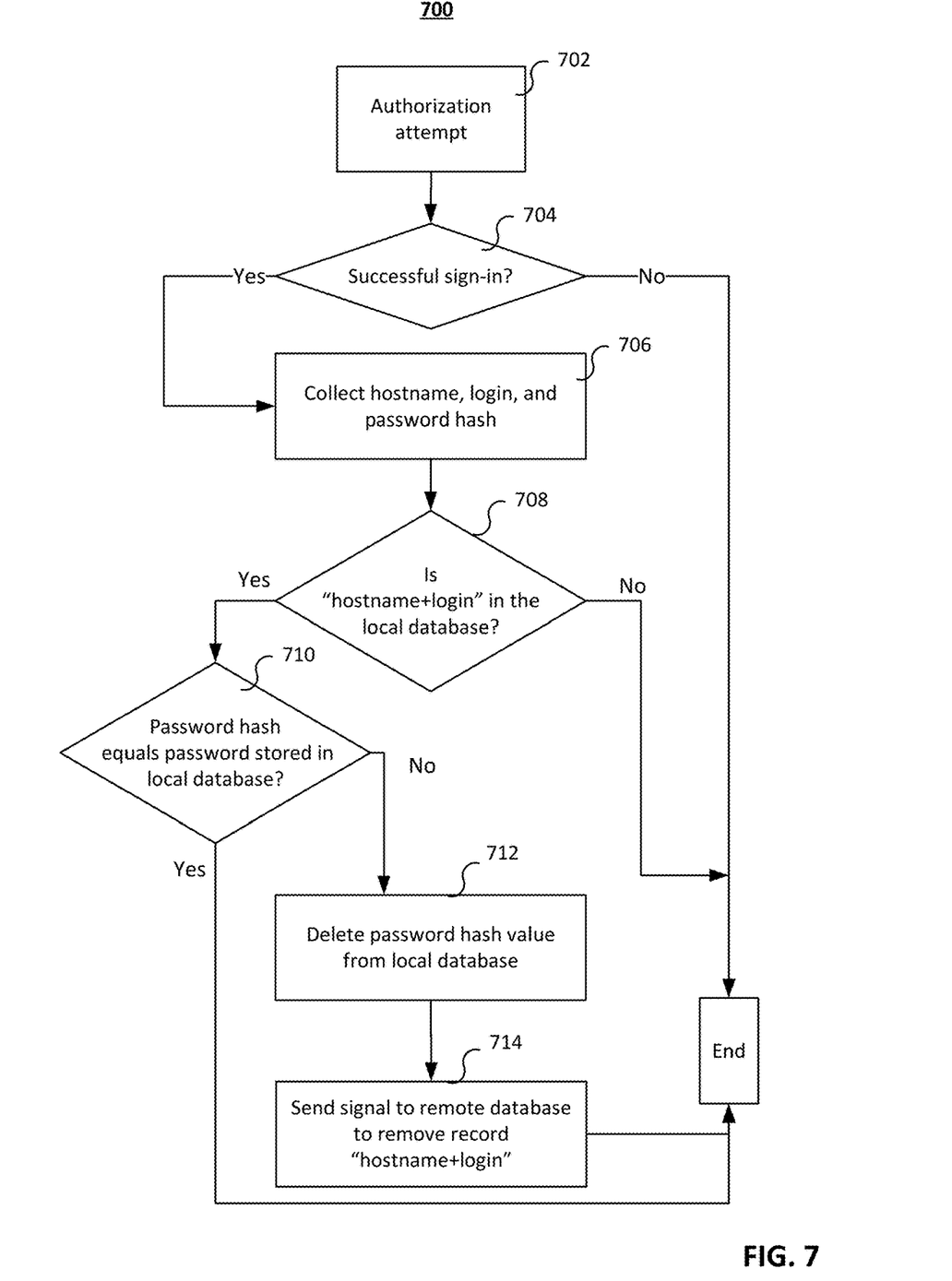
FIG. 7 illustrates a flow diagram of a method for monitoring a password reset via API, CLI, or a script.

FIG. 7 illustrates a flow diagram of method 700 for monitoring a password reset via application programming interface (API), command line interface (CLI), or a script. In FIG. 700, a new password may have been implemented without the knowledge of compromise module 106. For example, the user may have updated the password directly in the database or using server scripts bypassing the web form of the change. However, compromise module 106 may still determine the updated password. At 702, compromise module 106 receives an authorization attempt. At 704, compromise module 106 determines whether the authorization attempt was successful (i.e., the login credentials work). This is an example of a new password being received. In response to determining that the authorization attempt was unsuccessful, method 700 ends. Otherwise, method 700 proceeds to 706, where compromise module 106 collects the hostname, username, and hash value of the input password.

At 708, compromise module 106 determines whether the string concatenating the hostname and username is in local database 116. In response to determining that the string is not, method 600 ends. However, if the string is in local database 116, at 710, compromise module 106 determines whether the hash value of the input password (e.g., new password matches the hash value in local database 116. In response to determining a match, method 700 ends. This suggests that the password was not changed. However, if no match is detected, at 712, compromise module 106 deletes the password hash value (of the old password) from local database 116. At 714, compromise module 106 transmits a signal to remote database 118 to remove any records associated with the string.

Figure 8:
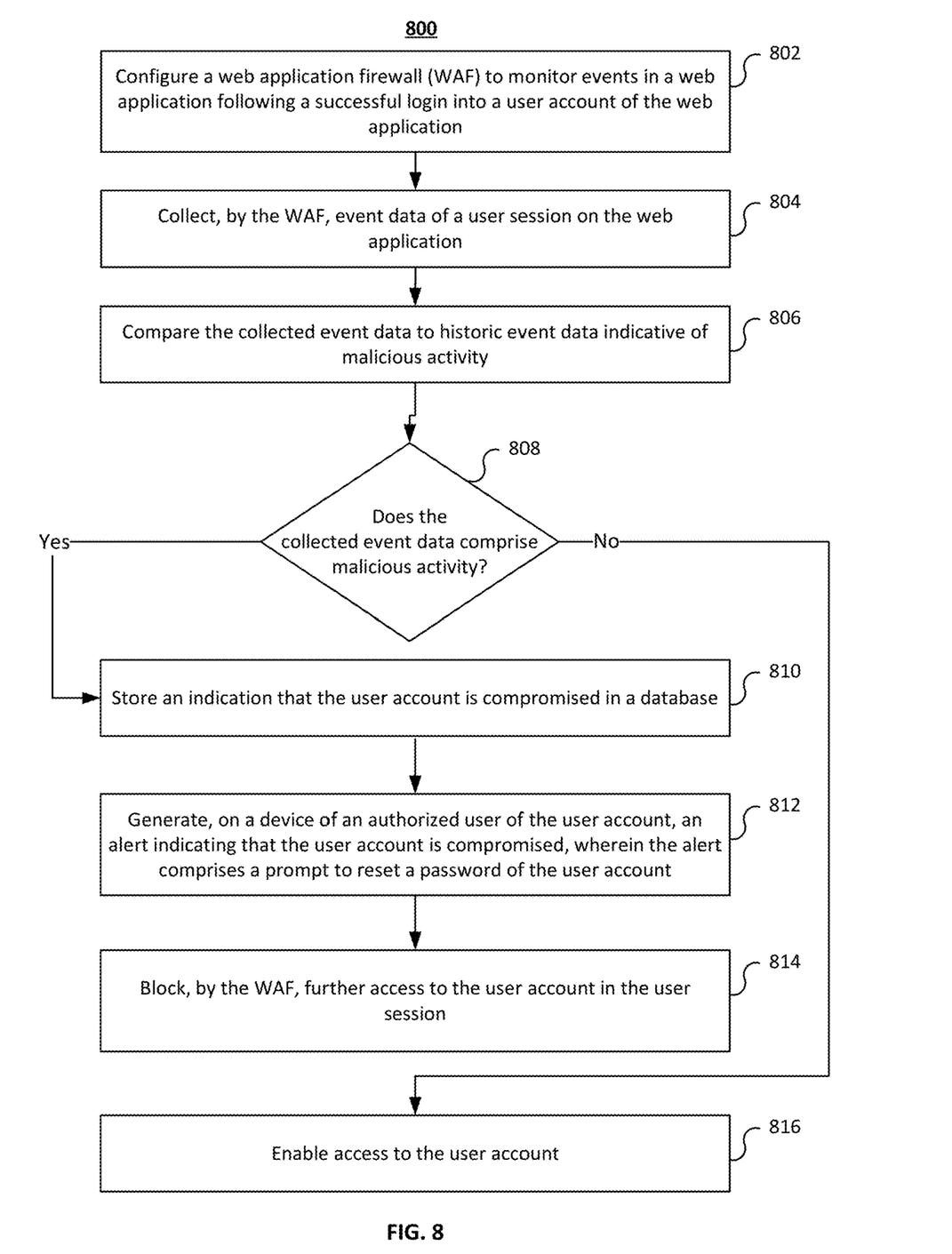
FIG. 8 illustrates a flow diagram of a method for detecting and resolving user account compromise using a password reset.

FIG. 8 illustrates a flow diagram of method 800 for detecting and resolving user account compromise using a password reset. At 802, compromise module 106 configures a web application firewall (WAF) to monitor events in a web application following a successful login into a user account of the web application. At 804, compromise module 106 collects, by the WAF, event data of a user session on the web application. At 806, compromise module 106 compares the collected event data to historic event data indicative of the malicious activity. At 808, based on the comparison, compromise module 106 determines whether the collected event data comprises malicious activity. In response to determining that no malicious activity is present, method 800 ends at 816 where compromise module 106 enables access to the user account. However, in response to determining, by the WAF, that the collected event data corresponds to the historic event data, at 810, compromise module 106 stores an indication that the user account is compromised in a database. At 812, compromise module 106 generates, on a device of an authorized user of the user account, an alert indicating that the user account is compromised, wherein the alert comprises a prompt to reset a password of the user account. At 814, compromise module 106 blocks, by the WAF, further access to the user account in the user session.

Figure 9:
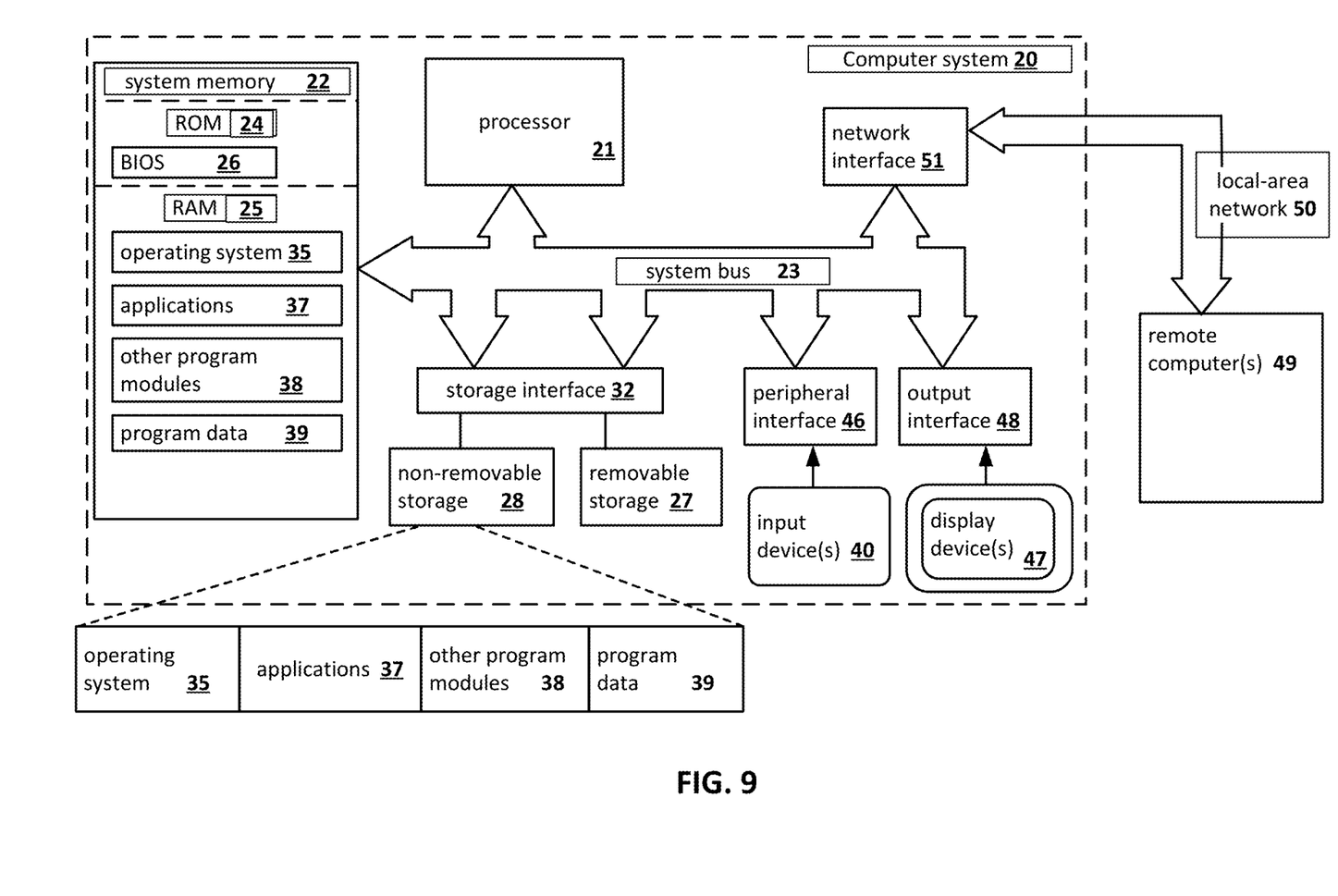
FIG. 9 presents an example of a general-purpose computer system on which aspects of the present disclosure can be implemented.

FIG. 9 is a block diagram illustrating a computer system 20 on which aspects of systems and methods for detecting and resolving user account compromise using a password reset may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting and resolving account compromise, the method comprising:
    configuring a web application firewall (WAF) to monitor events in a web application following a successful login into a user account of the web application;
    collecting, by the WAF, event data of a user session on the web application;
    determining whether the collected event data comprises malicious activity by comparing the collected event data to historic event data indicative of the malicious activity;
    in response to determining, by the WAF, that the collected event data corresponds to the historic event data:
        storing an indication that the user account is compromised in a database, wherein the indication is a string comprising a hostname of the web application and a username of the user account, further comprising:
            in response to detecting the successful login, generating and storing the string in a local access database (LDB); and
            transmitting the string to a remote access database (RDB):
        generating, on a device of an authorized user of the user account, an alert indicating that the user account is compromised, wherein the alert comprises a prompt to reset a password of the user account; and
        blocking, by the WAF, further access to the user account in the user session.

2. The method of claim 1, wherein generating the alert is further in response to detecting a subsequent login attempt and identifying the indication in the database.

3. The method of claim 1, wherein the collected event data comprises an IP address, and wherein determining that the collected event data corresponds to the historic event data comprises determining that the IP address is of a malicious entity monitored in the historic event data.

4. The method of claim 1, wherein the collected event data further comprises a hostname of the web application and a username of the user account.

5. The method of claim 4, further comprising: in response to determining that the collected event data corresponds to the historic event data, storing a record comprising the hostname and the username in the remote access database (RDB) until a new password is received; and
    deleting the record in response to receiving the new password.

6. The method of claim 1, further comprising:
    creating a list of hosts that require a password reset;
    configuring the WAF to collect the event data and transmit the alert for the list of hosts.

7. The method of claim 1, further comprising:
    configuring the WAF to check if an input string, comprising a given hostname and a given username, of a subsequent successful login is present in the RDB.

8. The method of claim 1, wherein storing the string in the LDB comprises:
    creating a record for the string in the LDB;
    storing a hash value of a user password and a cookie value of an authorization cookie in the LDB; and
    writing, in the RDB, a zero to password and cookie fields in absence of the string.

9. The method of claim 8, further comprising:
    configuring the WAF to:
        compare an input hash value of an input password with the hash value of the password in the LDB; and
        redirect the user to a password reset page in response to detecting, based on a comparison, that the input hash value matches the hash value in the LDB.

10. The method of claim 8, further comprising:
    configuring the WAF to:
        compare an input cookie value with the cookie value of the authorization cookie in the LDB; and
        redirect a user to a password reset page in response to detecting, based on a comparison, that the input cookie value matches the cookie value in the LDB.

11. The method of claim 1, further comprising updating the RDB and LDB with a new password in response to confirming that the new password does not match an old password.

12. The method of claim 1, further comprising:
    configuring the WAF to monitor the web application for a successful password change;
    in response to receiving a new password, generating a string using cookies for a site name and address of the web application.

13. A system for detecting and resolving account compromise, comprising:
    a memory; and
    a hardware processor communicatively coupled with the memory and configured to:
        configure a web application firewall (WAF) to monitor events in a web application following a successful login into a user account of the web application;
        collect, by the WAF, event data of a user session on the web application;
        determine whether the collected event data comprises malicious activity by comparing the collected event data to historic event data indicative of the malicious activity;
        in response to determining, by the WAF, that the collected event data corresponds to the historic event data:
            store an indication that the user account is compromised in a database, wherein the indication is a string comprising a hostname of the web application and a username of the user account, wherein the hardware processor is further configured to:

in response to detecting the successful login, generate and store the string in a local access database (LDB); and transmit the string to a remote access database (RDB);

generate, on a device of an authorized user of the user account, an alert indicating that the user account is compromised, wherein the alert comprises a prompt to reset a password of the user account; and block, by the WAF, further access to the user account in the user session.

14. The system of claim 13, wherein the hardware processor is configured to generate the alert further in response to detecting a subsequent login attempt and identifying the indication in the database.

15. The system of claim 13, wherein the collected event data comprises an IP address, and wherein determining that the collected event data corresponds to the historic event data comprises determining that the IP address is of a malicious entity monitored in the historic event data.

16. The system of claim 13, wherein the collected event data further comprises a hostname of the web application and a username of the user account.

17. The system of claim 16, wherein the hardware processor is further configured to: in response to determining that the collected event data corresponds to the historic event data, store a record comprising the hostname and the username in the remote access database (RDB) until a new password is received; and delete the record in response to receiving the new password.

18. The system of claim 13, further comprising:
creating a list of hosts that require a password reset;
configuring the WAF to collect the event data and transmit the alert for the list of hosts.

19. A non-transitory computer readable medium storing thereon computer executable instructions for detecting and resolving account compromise, including instructions for:

configuring a web application firewall (WAF) to monitor events in a web application following a successful login into a user account of the web application;

collecting, by the WAF, event data of a user session on the web application;

determining whether the collected event data comprises malicious activity by comparing the collected event data to historic event data indicative of the malicious activity;

in response to determining, by the WAF, that the collected event data corresponds to the historic event data:

storing an indication that the user account is compromised in a database, wherein the indication is a string comprising a hostname of the web application and a username of the user account, further comprising:

in response to detecting the successful login, generating and storing the string in a local access database (LDB); and transmitting the string to a remote access database (RDB);

generating, on a device of an authorized user of the user account, an alert indicating that the user account is compromised, wherein the alert comprises a prompt to reset a password of the user account; and blocking, by the WAF, further access to the user account in the user session.

\* \* \* \* \*